W. F. ATHERTON.
BROILER.
No. 175,900. Patented April 11, 1876.
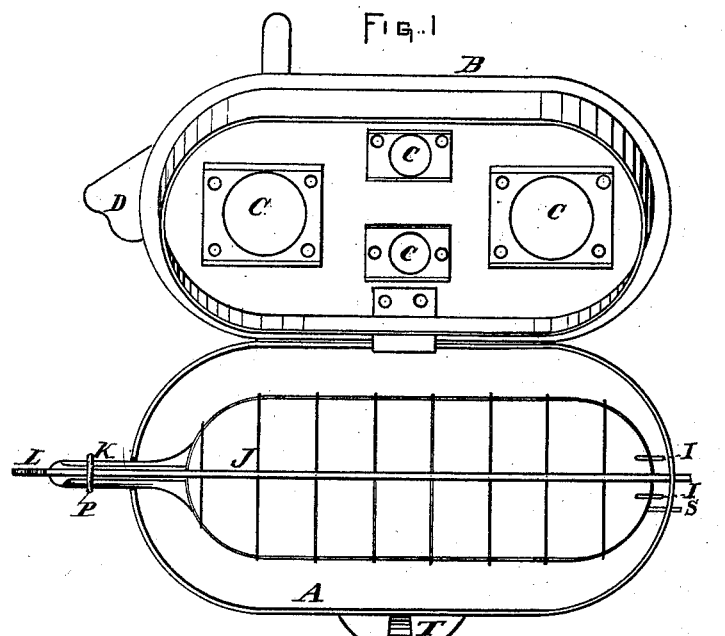
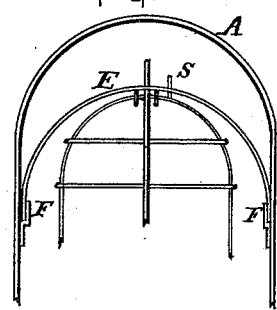
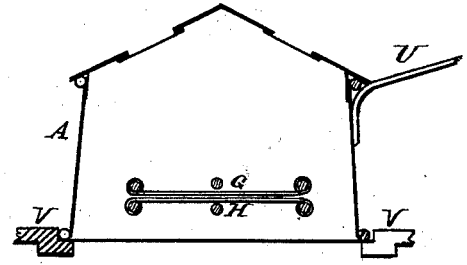
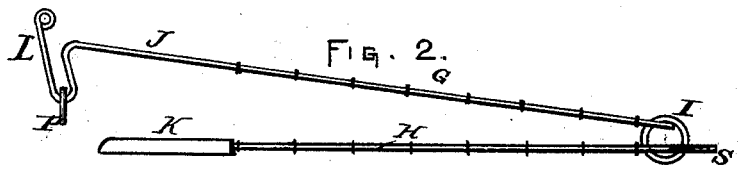
ATTEST:
O. H. Adix
K. M. Shepard
INVENTOR:
William F. Atherton
By G. L. Chapin
Atty.
N. PETERS, PHOTO-LITHOGRAPHER, WASHINGTON, D. C.

UNITED STATES PATENT OFFICE.

WILLIAM F. ATHERTON, OF CHICAGO, ILLINOIS.

IMPROVEMENT IN BROILERS.

Specification forming part of Letters Patent No. 175,900, dated April 11, 1876; application filed January 21, 1876.

*To all whom it may concern:*

Be it known that I, WILLIAM F. ATHERTON, of Chicago, in the county of Cook and State of Illinois, have invented a new and useful Improvement in Broilers, of which the following is a specification:

The present invention relates to an improvement in a utensil for broiling meats over a stove or range; and its nature consists of an open-bottomed receptacle to be placed over the griddle-holes, and it is provided with a two-part revolving holder, which is provided with pins or stops to hold it in a horizontal position when adjusted. The holder-handle extends outside of the receptacle, and far enough beyond the top of a stove to be handled conveniently, the two-part handle being held together by a clamping-ring, which falls into a hook, and is retained in position for use. One end of the receptacle is provided with a division-plate, whereby longer or shorter holders can be used, according to the size of meat to be broiled; and, further, in extension-plates to cover the different forms of stove-holes, and in a hinged cover, which is provided with a plate to close the handle-slot, and with mica for the examination of the meat when broiling, as the whole is to be hereinafter described and shown.

In the drawings, Figure 1 is a plan or top view of the improvement in broilers, with the cover open to show the holder inside. Fig. 2 shows the holder removed from its receptacle and open. Fig. 3 shows the position of the plate for use when a short holder is used. Fig. 4 is a transverse section of the broiler. Fig. 5 is an end elevation of the broiler, showing the plate for closing the handle-opening.

A represents the bottom part of the broiler-case, which may be made of sheet or cast metal, as most convenient. In either case I prefer that it should be inclined inward at the top, so as to have a less area at that part. B represents the cover, which, in practice, should be crowning to admit of the holder inside having room to turn, and, to enable the condition of the meat to be seen, mica is put in the top, as shown at C. The top is also provided with a plate, D, which shuts over the end of the part, A, and covers a slot therein for removing the holder, and prevents the escape of smoke.

In all cases it is necessary that the bottom part A should cover the griddle-holes of a stove; but it is not for broiling small pieces of meat necessary that the long meat-holder, shown at Fig. 2, should be used. For this reason a stationary or removable plate, E, is placed inside of plate or bottom A, and if it be a removable plate its ends are secured in lugs F, either cast solid to or riveted to the plate A.

The meat-holder is shown at S G H I J K L P and consists of open frames G H hinged together at I, and made to terminate in a handle, J, fitting, when shut, into a sleeve-handle, K, on frame H. The handle J terminates in a loop, L, in which is hung the ring P for holding the handles together when meat is placed between the frame G H. The hinged end of the frame terminates in a spur, S, which, when the holder lies flat in the case, projects through the latter, as shown at Fig. 1. The holder being shorter than the case, it is drawn endwise to disengage the spur S from its fastening.

When the plate E is used for a shorter broiler the latter is also to have a spur, S, as shown in Fig. 3, for holding it level.

I know that clamps for holding meat for broiling are well known. I therefore, in that regard, confine myself to my specific claim, and I do not claim, broadly, a broiling-meat holder operated in a case, as such is old.

The partition or center plate of many stoves and ranges extends outside of the line of the griddle-holes, and to cover such space, and prevent the escape of smoke, I attach to the part A extension-plates T, as shown in Fig. 1, such plates being of any suitable form for this purpose.

For the convenience of handling the device a handle, U, is attached to the part A. V represents a section of the stove with boiler in position thereon.

I claim and desire to secure by Letters Patent—

1. The meat-holder G H, combined with the spur S, sleeve K, handle J, loop L, and ring P, combined with a case or receptacle, A B, substantially as set forth.

2. The case A B, provided with shortening-plate E, and combined with a meat-holder arranged to revolve, and to be locked in a horizontal position, as described and shown.

WILLIAM F. ATHERTON.

Witnesses:
 O. H. ADIX,
 G. L. CHAPIN.